US008879833B2

(12) United States Patent
Kitabatake et al.

(10) Patent No.: US 8,879,833 B2
(45) Date of Patent: Nov. 4, 2014

(54) GENERATING AN IMAGE OF A SEAL IMPRESSION

(75) Inventors: Yasuhiro Kitabatake, Kanagawa-ken (JP); Tetsuo Shiba, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 195 days.

(21) Appl. No.: 13/606,436

(22) Filed: Sep. 7, 2012

(65) Prior Publication Data

US 2013/0089255 A1 Apr. 11, 2013

(30) Foreign Application Priority Data

Oct. 7, 2011 (JP) ................................. 2011-223411

(51) Int. Cl.
*G06K 9/00* (2006.01)
*G06T 5/50* (2006.01)
*G06T 1/00* (2006.01)
*G01B 11/25* (2006.01)

(52) U.S. Cl.
CPC . *G01B 11/25* (2013.01); *G06T 5/50* (2013.01); *G06T 1/0007* (2013.01); *G06T 2207/10152* (2013.01); *G06T 2207/20221* (2013.01); *G01B 11/2513* (2013.01)
USPC .......................................... 382/162; 382/100

(58) Field of Classification Search
None
See application file for complete search history.

(56) References Cited

U.S. PATENT DOCUMENTS

| 7,399,983 | B2* | 7/2008 | Yokote ...................... 250/559.4 |
|---|---|---|---|
| 2003/0063772 | A1* | 4/2003 | Smith et al. .................. 382/100 |
| 2010/0141756 | A1* | 6/2010 | Grote et al. ................... 348/127 |
| 2012/0170813 | A1* | 7/2012 | Benayad-Cherif ........... 382/103 |
| 2013/0089255 | A1* | 4/2013 | Kitabatake et al. ............ 382/162 |
| 2013/0287293 | A1* | 10/2013 | Genc et al. .................... 382/154 |

FOREIGN PATENT DOCUMENTS

| JP | 62280984 | 12/1987 |
|---|---|---|
| JP | 11096362 | 4/1999 |
| JP | 2005207993 | 8/2005 |
| JP | 2005250629 | 9/2005 |
| JP | 2010224784 | 10/2010 |

OTHER PUBLICATIONS

U.S. Appl. No. 14/478,182, filed Sep. 5, 2014.

* cited by examiner

*Primary Examiner* — Sean Motsinger
(74) *Attorney, Agent, or Firm* — Schmeiser, Olsen & Watts, LLP; John Pivnichny

(57) ABSTRACT

A method and apparatus for generating an image of a seal impression. Irradiation of a face of a seal with N beams of light striking the face in succession from N respective different directions respectively corresponding to N different angles of incidence of the light on the face is caused, the face having a character thereon, $N \geq 2$. N still images of the face corresponding respectively to the N beams are acquired, each still image structured as pixels including a RGB color combination. The N still images are combined to generate a composite image of pixels that includes a common area of pixels that commonly appears on the face of the seal in all still images, the common area having a luminance value exceeding a specified luminance threshold, the common area including a character area pertaining to where the engraved character is located on the face of the seal.

20 Claims, 9 Drawing Sheets

GENERATING AN IMAGE OF A SEAL IMPRESSION

TECHNICAL FIELD

The present invention relates generally to an apparatus and method for generating an image of a seal impression, and more particularly to an apparatus and method for generating an image of a seal impression by photographing the face of a seal.

BACKGROUND

It is a common practice to enter information on digital forms in order to promote paperless procedures. A problem arises when a seal needs to be affixed on a digital form. In such a case, typically a seal is affixed on paper, then the seal is scanned with a scanner to acquire an image of the seal, and the image is put on the digital form. However, true paperless cannot be achieved by this method.

It has been conventionally known to pick a seal impression by directly taking an image of a seal-impression face (the face of a seal) with a TV camera. However, there is a problem that, when the face of a seal is ordinarily photographed, it is not possible to discriminate between a character part and a carved part on the face of the seal with high accuracy.

BRIEF SUMMARY

The present invention provides a method for generating an image of a seal impression, said method comprising:

causing, by a processor of an information processing apparatus, irradiation of a face of a seal with N beams of light striking the face in succession from N respective different directions respectively corresponding to N different angles of incidence of the light on the face, said face having a character engraved thereon, said N at least 2;

said processor acquiring N still images of the face corresponding respectively to the N beams of light striking the face in succession, each still image structured as a set of pixels such that each pixel comprises a red-green-blue (RGB) color combination; and said processor combining the N still images to generate a composite image of pixels, said combining comprising generating in the composite image a common area of pixels that commonly appears on the face of the seal in all still images of the N still images, said common area having a luminance value exceeding a specified luminance threshold, said common area including a character area pertaining to where the engraved character is located on the face of the seal.

The present invention provides an information processing apparatus, comprising a processor, a memory coupled to the processor, and a computer readable storage device coupled to the processor, said storage device containing program code configured to be executed by the processor via the memory to implement a method for generating an image of a seal impression, said method comprising:

said processor causing irradiation of a face of a seal with N beams of light striking the face in succession from N respective different directions respectively corresponding to N different angles of incidence of the light on the face, said face having a character engraved thereon, said N at least 2;

said processor acquiring N still images of the face corresponding respectively to the N beams of light striking the face in succession, each still image structured as a set of pixels such that each pixel comprises a red-green-blue (RGB) color combination; and said processor combining the N still images to generate a composite image of pixels, said combining comprising generating in the composite image a common area of pixels that commonly appears on the face of the seal in all still images of the N still images, said common area having a luminance value exceeding a specified luminance threshold, said common area including a character area pertaining to where the engraved character is located on the face of the seal.

The present invention provides a computer program product, comprising a computer readable storage device having a computer readable program code stored therein, said program code configured to be executed by a processor of an information processing apparatus to implement a method for generating an image of a seal impression, said method comprising:

said processor causing irradiation of a face of a seal with N beams of light striking the face in succession from N respective different directions respectively corresponding to N different angles of incidence of the light on the face, said face having a character engraved thereon, said N at least 2;

said processor acquiring N still images of the face corresponding respectively to the N beams of light striking the face in succession, each still image structured as a set of pixels such that each pixel comprises a red-green-blue (RGB) color combination; and said processor combining the N still images to generate a composite image of pixels, said combining comprising generating in the composite image a common area of pixels that commonly appears on the face of the seal in all still images of the N still images, said common area having a luminance value exceeding a specified luminance threshold, said common area including a character area pertaining to where the engraved character is located on the face of the seal.

DETAILED DESCRIPTION

Figure 1:
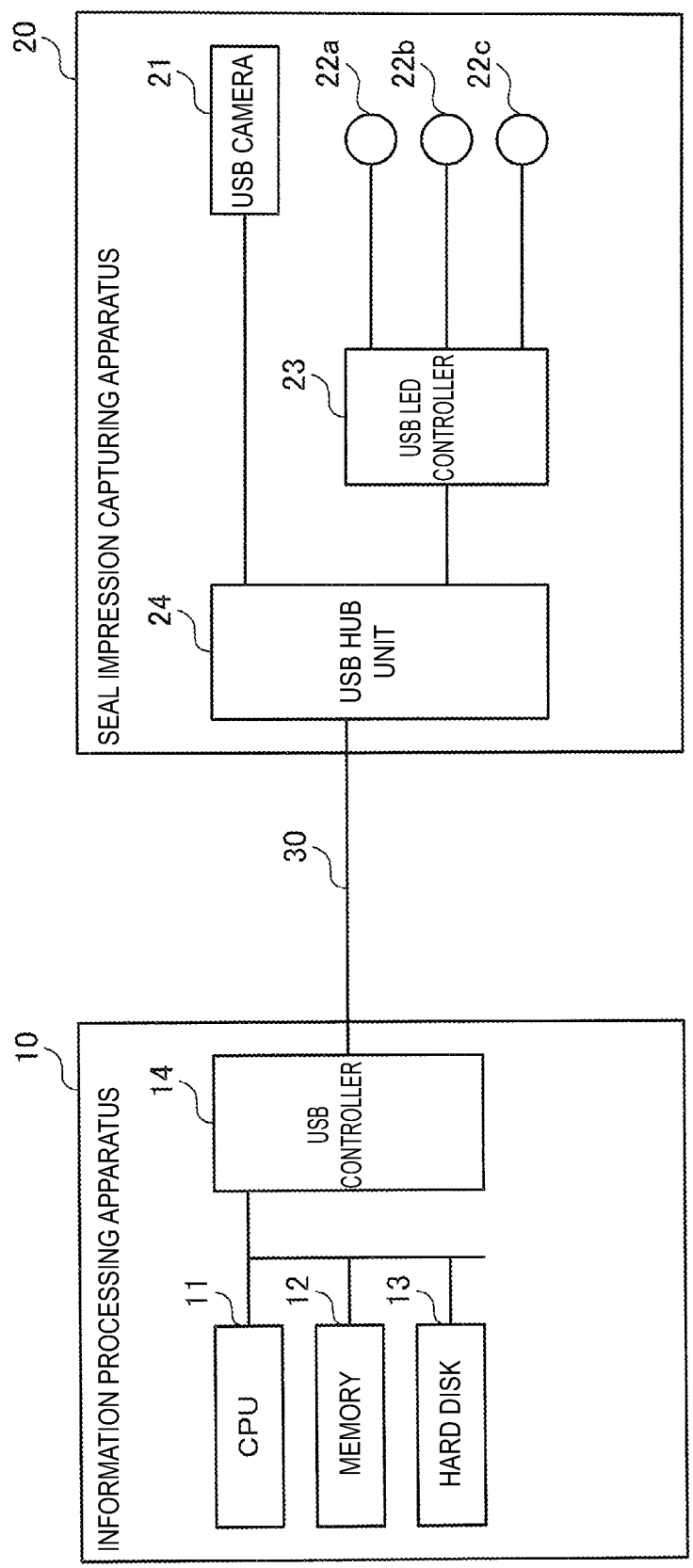
FIG. 1 is a diagram generally illustrating an exemplary configuration of a seal impression image generation system, in accordance with embodiments of the present invention.

The present invention will be described below in detail with reference to the accompanying drawings.

The present invention generates an image of a seal impression by taking an images of the face of a seal, improve the accuracy of the generated image of the seal impression.

The present invention provides an apparatus generating an image of a seal impression by taking an image of the face of a seal, the apparatus including: a light irradiation section capable of irradiating the face of the seal with light from N directions (N: an integer of 2 or more) at such an angle that a shadow with a length of the radius of the face of the seal or longer is formed; an image-taking section taking an image of the face of the seal; an acquisition section acquiring N taken images by controlling the light irradiation section so as to irradiate the face of the seal with light from one direction among the N directions and controlling the image-taking section so as to take an image of the face of the seal which is irradiated with the light from the one direction by the light irradiation section, the acquisition section performing the controls for each of the N directions; and a generation section generating an image of the seal impression by extracting a part having brightness equal to or above a criterion in all of the N taken images acquired by the acquisition section.

Here, the light irradiation section may include N light-emitting devices and the acquisition section may control the light irradiation section so as to turn on one of the N light-emitting devices to irradiate the face of the seal with light from the one direction. Alternatively, the light irradiation section may include one light-emitting device and the acquisition section may position the light-emitting device in one of N positions relative to the face of the seal to control the light irradiation section so as to irradiate the face of the seal with light from the one direction.

In the apparatus, the angle formed by any two adjacent virtual directions among N virtual directions which are images projected on a virtual plane including the face of the seal in the N directions may be $(360°/N)°$.

Furthermore, N in the apparatus may be 3.

The present invention also provides an apparatus for generating an image of a seal impression by taking an image of the face of a seal, the apparatus including: a first light-emitting device provided at a position capable of irradiating the face of the seal with light at such an angle that a shadow with a length equal to or longer than the radius of the face of the seal is formed, from a first direction corresponding to a first virtual direction, an image being projected onto a virtual plane including the face of the seal in the first direction; a second light-emitting device provided at a position capable of irradiating the face of the seal with light at such an angle that a shadow with a length equal to or longer than the radius of the face of the seal is formed, from a second direction corresponding to a second virtual direction at 120° to the first virtual direction, an image being projected onto the virtual plane in the second direction; a third light-emitting device provided at a position capable of irradiating the face of the seal with light at such an angle that a shadow with a length equal to or longer than the radius of the face of the seal is formed, from a third direction corresponding to a third virtual direction at 120° to the first virtual direction and different from the second virtual direction, an image being projected onto the virtual plane in the third direction; a camera provided at a position capable of taking an image of the face of the seal; an acquisition section acquiring a first taken image by causing the camera to take an image of the face of the seal which is irradiated with light from the first direction by causing the first light-emitting device to light up, acquiring a second taken image by causing the camera to take an image of the face of the seal which is irradiated with light from the second direction by causing the second light-emitting device to light up, and acquiring a third taken image by causing the camera to take an image of the face of the seal which is irradiated with light from the third direction by causing the third light-emitting device to light up; and a generation section generating an image of the seal impression by extracting a part having brightness equal to or above a criterion in all of the first taken image, the second image and the third image acquired by the acquisition section.

The present invention further provides a method for generating an image of a seal impression by taking an image of the face of a seal, the method including: a light irradiation step of irradiating the face of the seal with light from one direction among N directions (N: an integer of 2 or more) at such an angle that a shadow with a length of the radius of the face of the seal or longer is formed; an image-taking step of taking an image of the face of the seal which is irradiated with light from the one direction at the light irradiation step; an acquisition step of acquiring N taken images by performing the light irradiation step and the image-taking step for each of the N directions; and a generation step of generating an image of the seal impression by extracting a part having brightness equal to or above a criterion in all of the N taken images acquired by the acquisition step.

The present invention further provides a computer program (i.e., software, program code, etc.) stored on a storage device, said computer program causing a computer to function as an apparatus for generating an image of a seal impression by taking an image of the face of a seal, the program causing the computer to function as: an acquisition section acquiring N taken images (N: an integer of 2 or more) obtained by performing a process of irradiating the face of the seal with light from one direction among N directions at such an angle that a shadow with a length of the radius of the face of the seal or longer is formed and a process of taking an image of the face of the seal which is irradiated with light from the one direction, for each of the N directions; and a generation section generating an image of the seal impression by extracting a part having brightness equal to or above a criterion in all of the N taken images acquired by the acquisition section.

Here, the program may further cause the computer to function as a control section that controls a light irradiation section so as to perform, for each of the N directions, a process of irradiating the face of the seal with light from the one direction, the light irradiation section being capable of irradiating the face of the seal with light from the N directions, and an image-taking section taking image of the face of the seal so as to perform, for each of the N directions, a process of taking an image of the face of the seal irradiated with light from the one direction by the light irradiation section.

The present invention can improve the accuracy of an image of a seal impression generated by taking images of the face of a seal.

In one embodiment, a surface where a character is engraved (hereinafter referred to as the "seal face") is irradiated with light at an acute angle so that shadows of the rim and the character are formed and still images of the seal face are taken with a CCD (Charge Coupled Device) camera. Such shooting is performed while changing the direction of light irradiation direction in increments of 120° C., and three still images are stored in a memory of an information processing apparatus. The three still images stored are superimposed together, so that bright parts that are common to the three still images can be extracted. Thus, an image of the seal impression that is very close to an image of a seal impression affixed on paper can be contactlessly extracted. This enables an image of the seal impression to be superimposed on a digital form or the like on the information processing apparatus.

Thus, paperless management of documents that require seal impressions can be achieved. Furthermore, the image of the seal impression can be registered so that an image of a seal impression affixed on a paper form can be checked against the registered seal impression image.

A first way to change the light irradiation direction may be lit up, one after another, three light sources placed in such positions that the direction of light irradiation changes in increments of 120°. A second way is to position a single light source in thee positions, from one position to another, that are set relative to a seal so that the irradiation direction of light from the single light source changes in increments of 120°. While the first way is used in this embodiment, the second way may be used.

FIG. 1 is a block diagram illustrating an exemplary configuration of a seal impression image generation system, in accordance with embodiments of the present invention.

As illustrated, the seal impression image generation system includes an information processing apparatus 10 and a seal impression capturing apparatus 20 which are interconnected through a USB cable 30.

The information processing apparatus 10 includes a CPU (Central Processing Unit) 11, which is computational processing means, a memory 12 and a hard disk 13, which are storage means, and a USB controller 14, which is a communication means. The CPU 11 executes various kinds of software such as an OS (Operating System) and applications to implement the present invention, which will be described later in conjunction with FIG. 8. The memory 12 is a storage space for storing various kinds of software and data used for executing the various kinds of software to implement methods of the present invention by the software being executed by the CPU 11 via the memory 12. The hard disk 13 is a tangible storage device for storing data input in various kinds of software and data output from the various kinds of software. The USB controller 14 sends and receives information to and from the seal impression capturing apparatus 20 through the USB cable 30. Thus, the information processing apparatus 10 comprises a processor (e.g., CPU 11), a memory 12 coupled to the processor, and a computer readable storage device (e.g., hard disk 13) coupled to the processor. The storage device contains program code (i.e., software) configured to be executed by the processor via the memory to implement the methods of the present invention. A computer program product of the present invention comprises a computer readable tangible storage device having computer readable program code (i.e., software) stored therein, the program code (i.e, software) configured to be executed by the processor to implement the methods of the present invention.

The seal impression capturing apparatus 20 includes a USB camera 21, LEDs (Light Emitting Diodes) 22a, 22b and 22c, an USB LED controller 23, and a USB HUB unit 24. The USB camera 21 is connected to the information processing apparatus 10 through the USB cable 30 and provides taken images to the information processing apparatus 10 for display. The USB camera 21 is one example of image-taking section. The LEDs 22a, 22b and 22c are light-emitting devices that emit light when current flowing through them. The LEDs are hereinafter sometimes collectively referred to as the LED 22 unless distinction among them is necessary. The USB LED controller 23 turns on and off switches on wires connected to the LEDs 22a, 22b and 22c. The combination of the LEDs 22a, 22b and 22c and the USB LED controller 23 is one example of a light irradiation section. The USB HUB unit 24 forwards a signal for controlling shooting with the USB camera 21 to the USB camera 21 and forwards a signal for controlling turning on and off of the LEDs 22a, 22b and 22c to the USB LED controller 23.

In the seal impression image generation system described above, the USB camera 21 connected to the information processing apparatus 10 is disposed in a position facing the face of a seal in the seal impression capturing apparatus 20.

Figure 2:
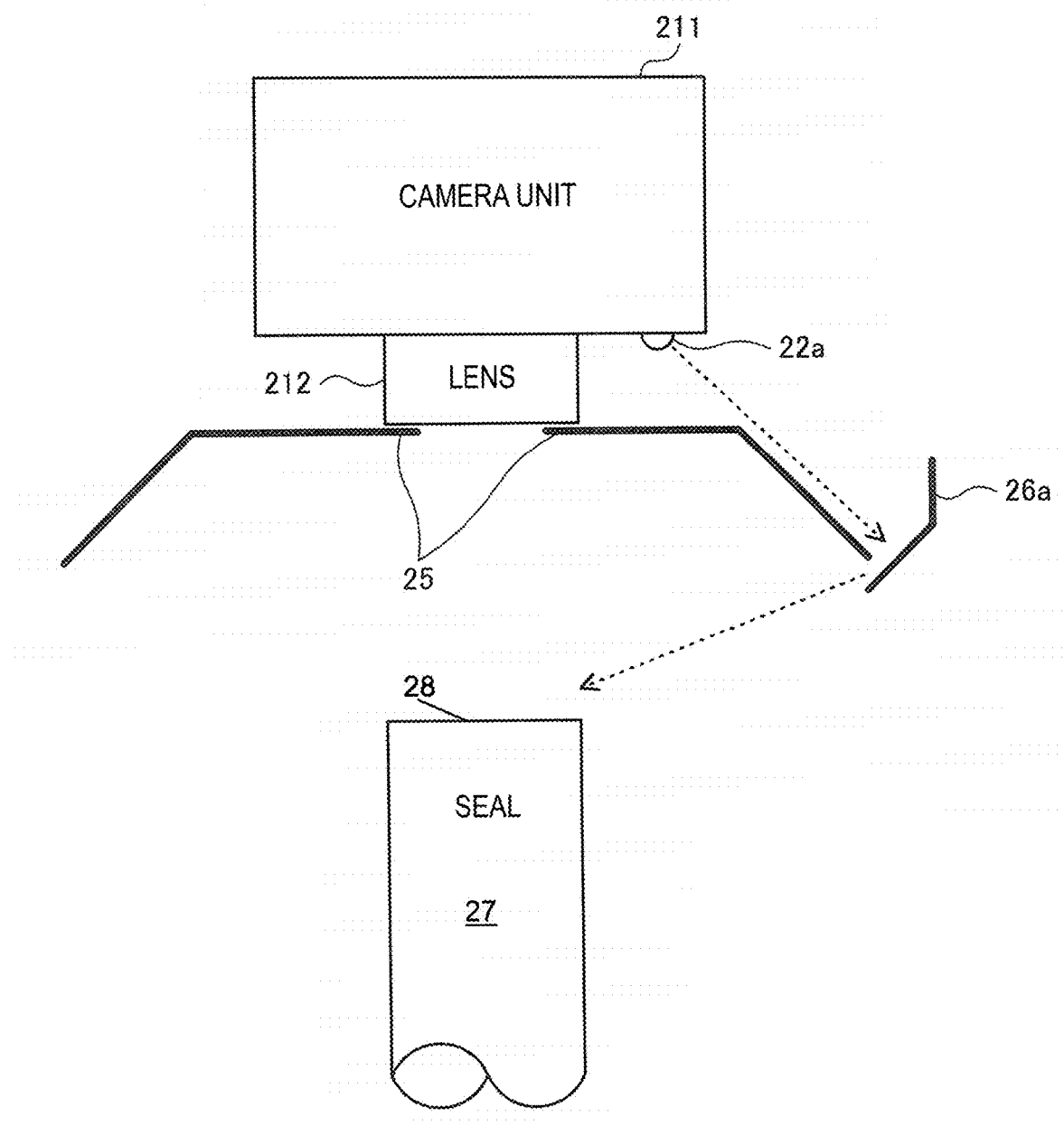
FIG. 2 is a diagram illustrating an exemplary configuration of a seal impression capturing apparatus, in accordance with embodiments of the present invention.

FIG. 2 is a cross-sectional view of the seal impression capturing apparatus 20, taken along a plane passing through the central axis of the seal and the LED 22a, in accordance with embodiments of the present invention.

As illustrated, the seal impression capturing apparatus 20 includes a camera unit 211 and a lens 212 which make up the USB camera 21. The lens 212 is disposed in such a way that the lens surface is parallel to the seal face 28 of a seal 27 to enable an image of the seal face to be taken from the direction perpendicular to the seal face 28.

While the seal impression capturing apparatus 20 includes the LEDs 22a, 22b and 22c, only the LED 22a is depicted because the LEDs are disposed in such positions that the irradiation directions of light are at an angle of 120° to one another and therefore only the LED 22a is in the plane of the cross section.

The seal impression capturing apparatus 20 further includes a light shield 25 for preventing light from the LED 22a from being directly incident on the seal face 28. The light shield 25 has an opening in a position coinciding with the lens 212 to allow the USB camera 21 to take a picture of the seal face 28.

The seal impression capturing apparatus 20 further includes a reflector 26a at an end of the light shield 25 with a slight gap between them. The reflector 26a reflects light emitted from the LED 22a toward the seal face 28. The gap between the light shield 25 and the reflector 26a serves as a slit for allowing light from the LED 22a to be linearly incident on the seal face 28.

While the USB camera 21 is disposed above the seal 27, the position of the USB camera 21 is not limited to this. The USB camera 21 may be disposed in any position where an image of the face of a seal can be taken.

While the configuration shown in a cross-sectional view of the seal impressing capturing apparatus 20 taken along a plane passing through the center axis of the seal 27 and the LED 22a has been described, the same description also applies to the configuration in a cross-sectional view of the seal impression capturing apparatus 20 taken along a plane passing through the central axis of the seal 27 and the LED 22b, and a cross-sectional view of the seal impression capturing apparatus 20 taken along a plane passing through the central axis of the seal 27 and the LED 22c.

Figure 3:
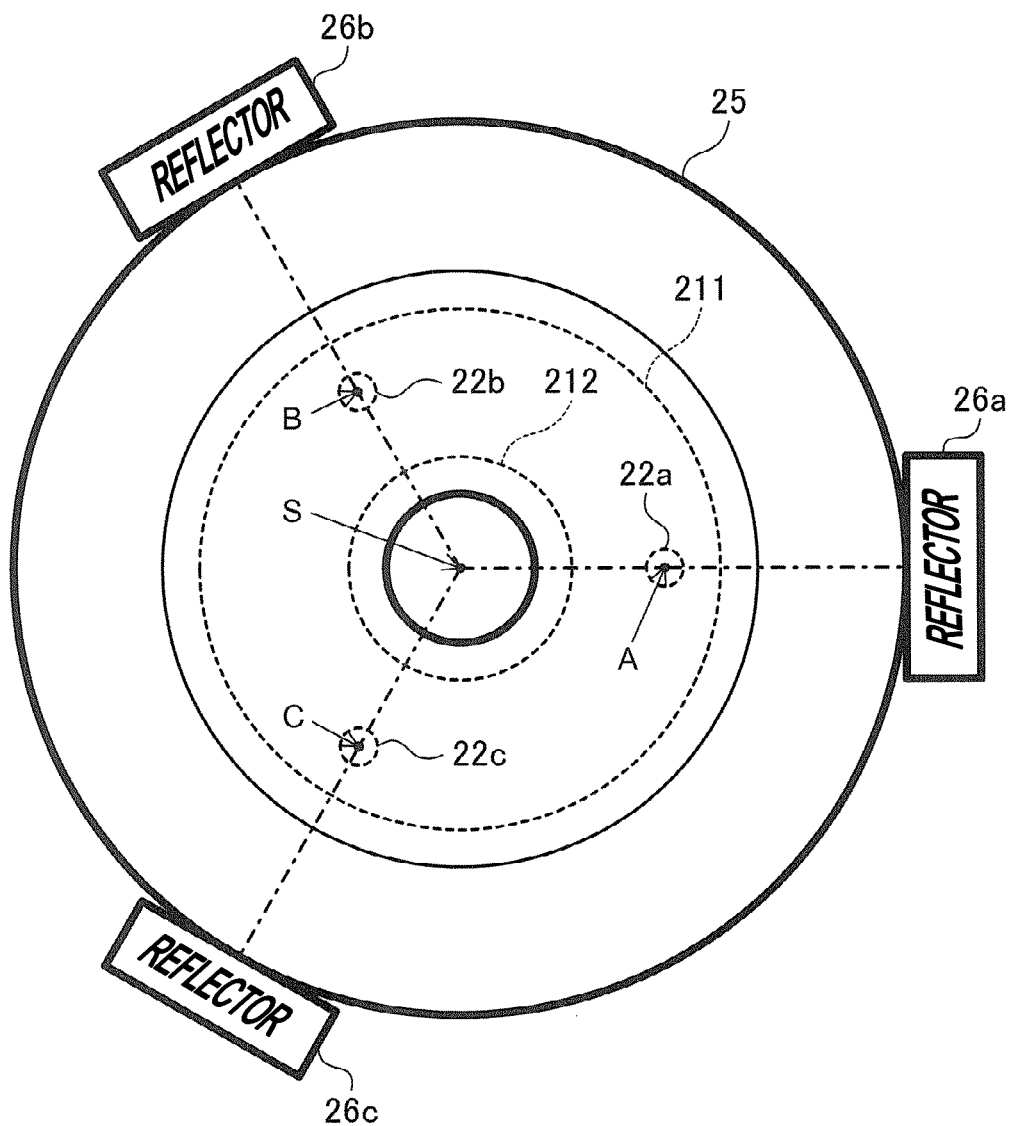
FIG. 3 is a diagram illustrating an exemplary configuration of the seal impression capturing apparatus, in accordance with embodiments of the present invention.

FIG. 3 is a diagram of the seal impression capturing apparatus 20 viewed from the seal side, in accordance with embodiments of the present invention. FIG. 3 illustrates an image of the seal impression capturing apparatus 20 projected on a virtual plane including the seal face 28, viewed from the seal side. Parts that are directly visible from the seal side are represented by solid lines and parts that are not visible from the seal side are represented by dashed lines.

As illustrated, the outer circumferences of the light shield 25, the camera unit 211, and the lens 212 constitute concentric circles about the center S of the seal face 28 of the seal 27. Note that the circle between the outer circumference of the light shield 25 and the outer circumference of the camera unit 211 represents the fold of the light shield 25 and the circle inside the outer circumference of the lens 212 represents the opening of the light shield 25.

The LEDs 22a, 22b and 22c are disposed in such a manner that line segments SA, SB, and SC are at an angle of 120° to one another, where A, B and C are the positions of the LEDs 22a, 22b and 22c (the positions of images of the LEDs 22a, 22b and 22c projected on the virtual plane including the seal face 28), respectively, viewed from the seal side.

The reflectors 26a, 26b and 26c are disposed in such a manner that the positions of the reflectors 26a, 26b and 26c (the positions of images of the reflectors 26a, 26b and 26c projected on the virtual plane including the seal face 28) viewed from the seal side are on a line extended from line segment SA on the A side, on a line extend from line segment SB on the B side, and on a line extended from line segment SC on the C side, respectively. The reflectors are hereinafter sometimes collectively referred to as the reflector 26 unless distinction among them is necessary.

An angle of irradiation of seal face 28 with light from the LED 22 will be described below.

Figure 4:
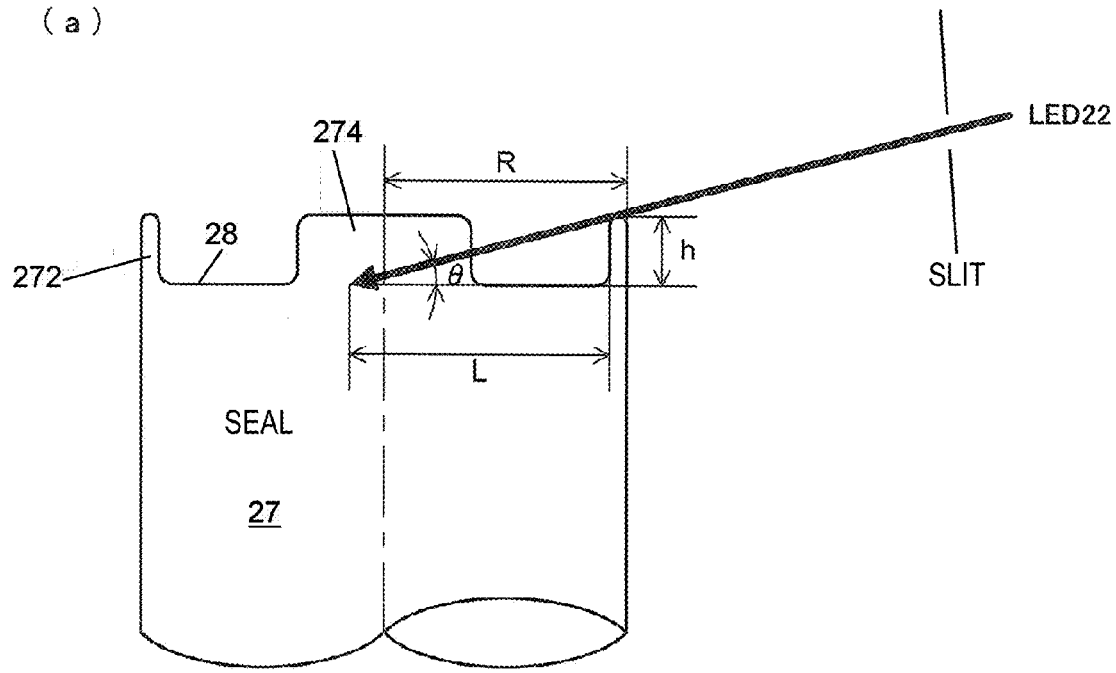
FIGS. 4(a) and 4(b) depict a diagram for explaining an incident angle of light from a Light Emitting Diode (LED) in accordance with embodiments of the present invention.
Figure 4:
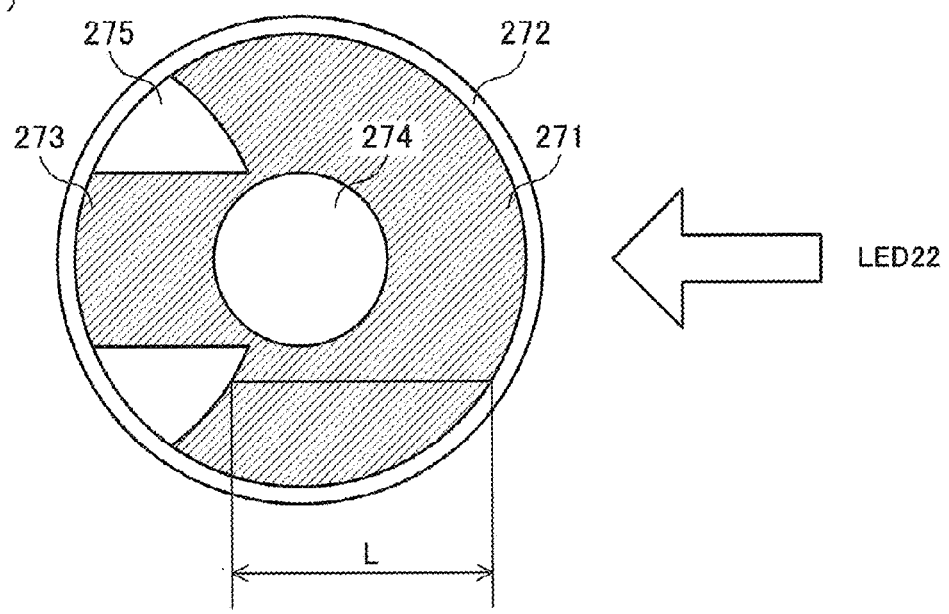

FIGS. 4(a) and 4(b) (collectively, "FIG. 4") illustrate irradiation of the seal face with light from the LED 22 at an irradiation angle set so that shadows of the rim of the seal and the character are formed, in accordance with embodiments of the present invention. LEDs are used as light sources because LEDs emit light that travels highly rectilinearly. The seal face 28 of the seal 27 is irradiated with light emitted from the LED 22 and traveling through a slit.

As illustrated, when the condition "θ≤arctan (h/R)" is satisfied, it follows that L≥R, where θ is the angle of irradiation with LED 22, R is the radius of the seal face, h is the depth of the engraved part of the seal face other than the character, and L is the length of shadows of the rim 272 and the character 274 on the seal face 28.

The radius R of the seal face 28 in this case is equal to the distance from the center of the seal face to the outer circumference of the rim 272 of the seal 27 and therefore includes the width of the rim of the seal whereas the length L of the shadows is equal to the distance from an end of the shadows to the inner circumference of the rim of the seal and therefore does not includes the width of the rim of the seal. It seems that the width of the rim of the seal affects the conditions given above. However, the width is not included in the condition because the width of the rim of the seal is undetermined in this embodiment. The wider the rim, the farther the end of the shadow will be located from the direction of light irradiation. Accordingly, if the condition "θ≤arctan (h/R)" is satisfied, then the relation L≥R always holds regardless of the width of the rim of the seal, and exclusion of the width of the rim of the seal does not cause a problem.

FIG. 4(a) depicts only the presence of the LED 22 in the direction of light irradiation and does not depicts light from the LED 22 being reflected by the reflector 26 before being incident on the seal face. That is, the LED 22 does not necessarily need to be disposed in such a position that light is reflected by the reflector 26 before being incident on the seal face. The LED 22 may be disposed in any position where irradiation can be accomplished at an angle to form a shadow longer than the radius of the seal face.

FIG. 4(b) illustrates shadows formed on the seal face 28 when the angle of irradiation 8 with the LED 22 satisfies the condition "θ≤arctan (h/R)". The hatching in FIG. 4(b) represents the shadows. The shadows are formed in areas that occupy more than a half of the engraved area excluding the character on the seal face and extend toward the direction opposite to the irradiation direction of the LED 22. Specifically, a shadow of the rim 272 of the seal is formed in an area 271 and a shadow of the character 274 is formed in an area 273. There are also areas in the engraved area other than the character on the seal face, such as an area 275, where no shadow is formed.

In practice, there are slightly brighter areas on the side irradiated with light diffusely reflected by curved parts on the rim 272 of the seal 27 and the edges of the character 274, and ink residuals in curved shapes.

Figure 5:
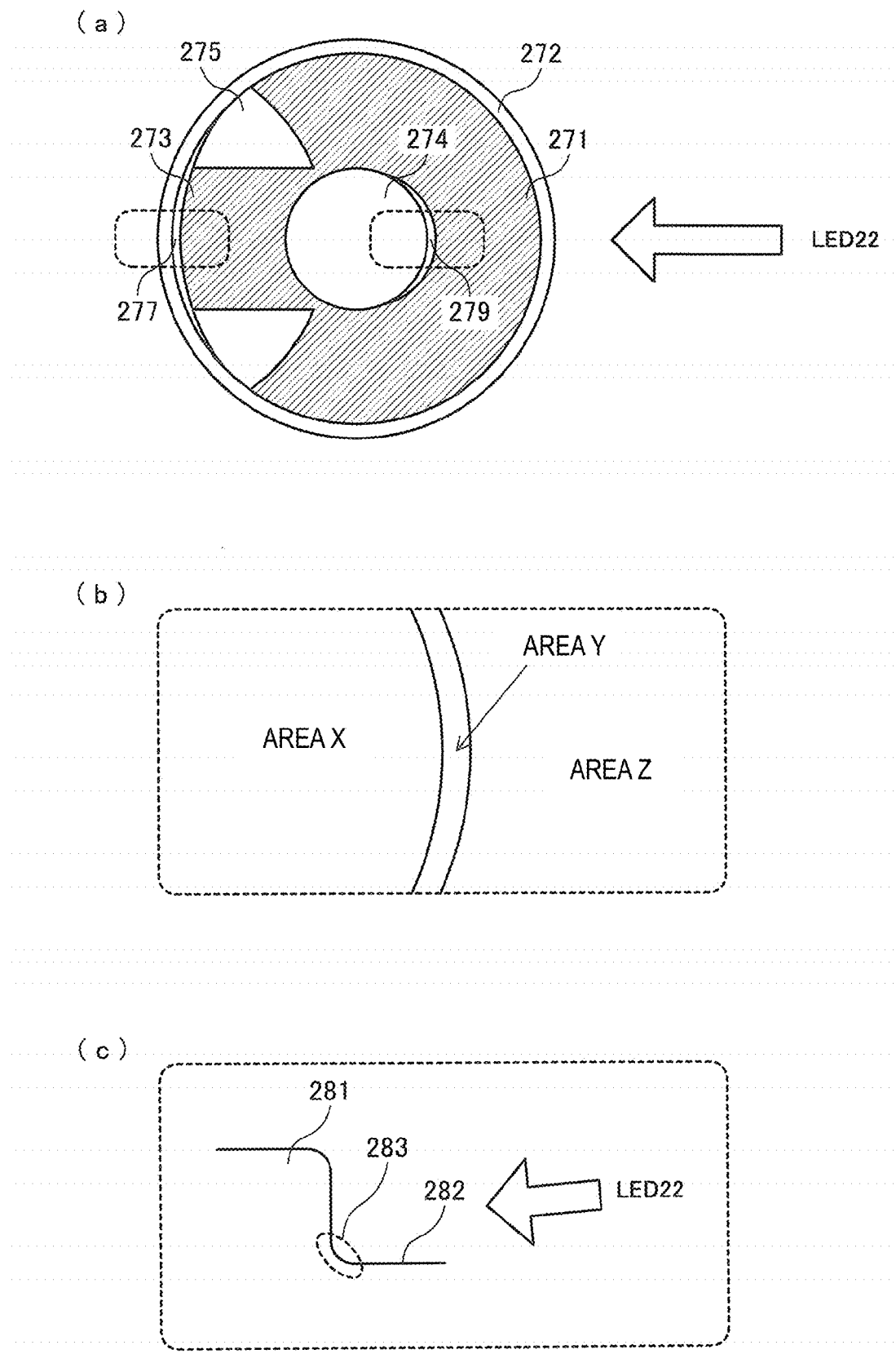
FIGS. 5(a), 5(b), and 5(c) are diagrams for explaining areas that are bright because of diffuse reflection of light, in accordance with embodiments of the present invention.

FIGS. 5(a), 5(b), and 5(c) (collectively, "FIG. 5") are diagrams for explaining slightly bright areas, in accordance with embodiments of the present invention.

FIG. 5(a) illustrates shadows formed on the seal face 28 of the seal 27 when the angle of irradiation θ with the LED 22 satisfies the condition "θ≤arctan (h/R)" as in FIG. 4(b). The areas 271 to 275 are the same as those in FIG. 4(b). FIG. 5(a) also depicts a slightly bright area 277 at the rim 272 of the seal face and a slightly bright area 279 at the edge of the character 274.

FIG. 5(b) is an enlarged view of parts enclosed in the dashed boxes in FIG. 4(a).

An area on the rim 272 of the seal and an area (area X) on the surface of the character 274 are bright because the areas are directly irradiated with light from the LED 22. Since the engraved area (area Z) other than the character 274 on the seal face is deeper by h, shadows of the rim 272 of the seal and the character 274 are formed to darken the area Z. On the other hand, an area on the rim 272 of the seal and an area on the edge of the character 274 on the LED 22 side (area Y) are slightly bright because there are curved parts and ink residuals which form angles likely to cause diffuse reflection.

FIG. 5(c) is a cross-sectional view of the seal face corresponding to (b).

A protruding part 281 corresponds to area x in (b) whereas a recessed part 282 corresponds to area Z in FIG. 5(b). The boundary part 283 between the protruding part 281 and the recessed part 282 corresponds to area Y in (b) where there are curved parts and ink residuals.

Still images are taken with the USB camera 21 under the conditions described above in one embodiment.

Here, the positions of the bright area 275 in the engraved area, other than the character in the seal face and the areas 277 and 279 (area Y in FIG. 5(b)), are bright because of diffusely reflected light that depends on the light irradiation direction.

Figure 6:
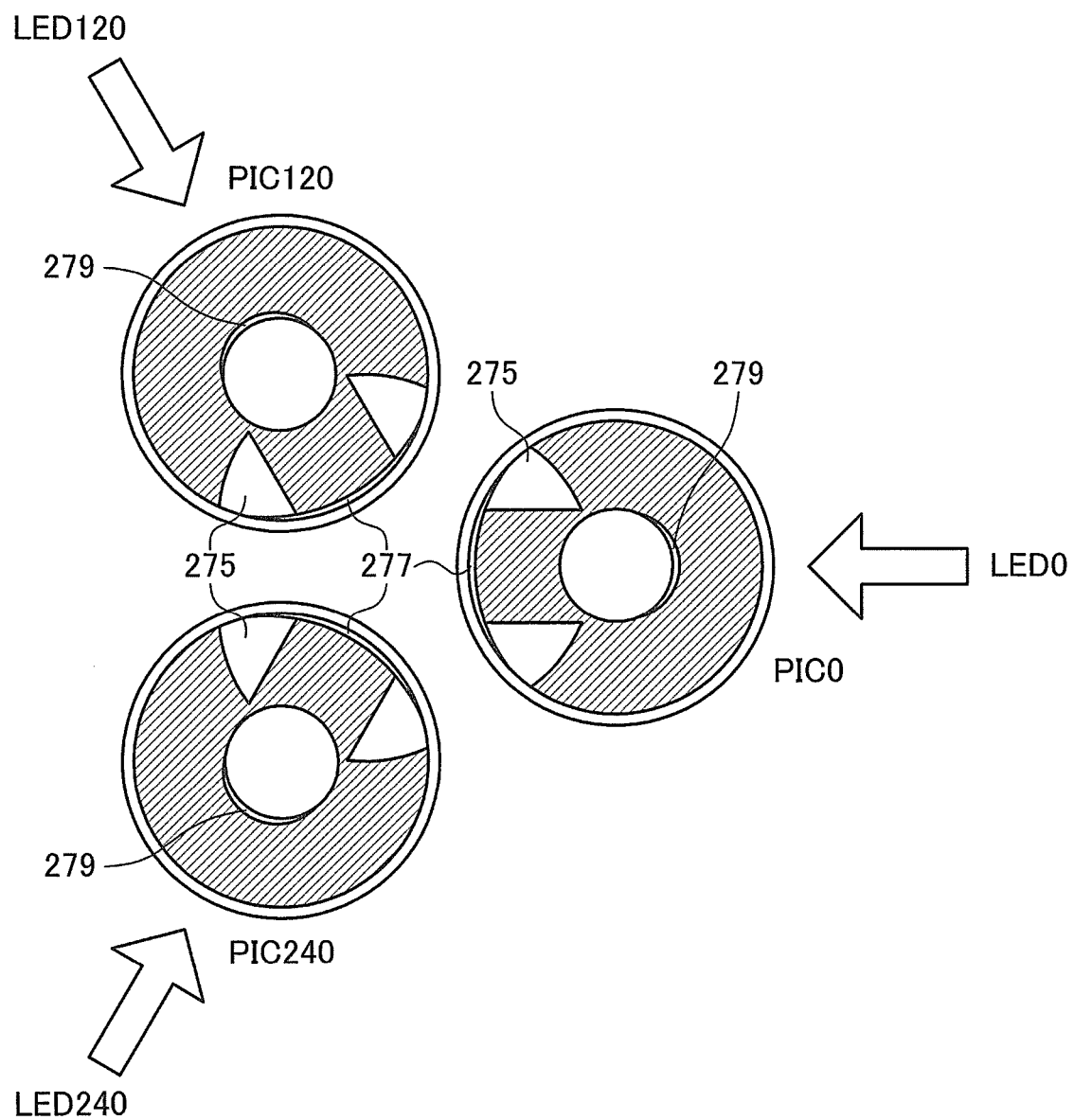
FIG. 6 is a diagram for explaining the relationship between the positions of bright areas and light irradiation directions, in accordance with embodiments of the present invention.

FIG. 6 is a diagram for explaining the relationship between the positions of bright areas and light irradiation directions, in accordance with embodiments of the present invention. Hereinafter, the LED 22a is denoted as LED0, indicating that the light irradiation direction is 0°, the LED 22b is denoted as LED120, indicating that the light irradiation direction is 120°, and the LED 22c is denoted as LED240, indicating that the light irradiation direction is 240°.

A still image PIC0 taken while irradiating with light from LED0 contains bright areas 277 and 279 at edges of the rim 272 of the seal 27 and the character 274 in the direction of 0° as illustrated. The still image PIC0 also contains a bright area 275 in the direction opposite to 0° where a shadow of the rim 272 is not formed.

A still image PIC120 taken while irradiating with light from LED120 contains slightly bright areas 277 and 279 at edges the rim 272 of the seal 27 and the character 274 in the direction of 120°. The still image PIC120 also contains a bright area 275 in the direction opposite to 120° where a shadow of the rim 272 of the seal is not formed.

A still image PIC240 taken while irradiating with light from LED240 contains slightly bright areas 277 and 279 at edges of the rim 272 of the seal 27 and the character 274 in the direction of 240°. The still image PIC240 also contains a bright area 275 in the direction opposite to 240° where a shadow of the rim 272 of the seal is not formed.

The bright parts common to the three still images are the surface of the seal face 28 excluding engraved parts, curved parts and parts where there are ink residuals. The bright parts are equivalent to a seal impression that would be left on paper after the seal was put on the paper. Therefore, the three still images are combined in this embodiment.

Figure 7:
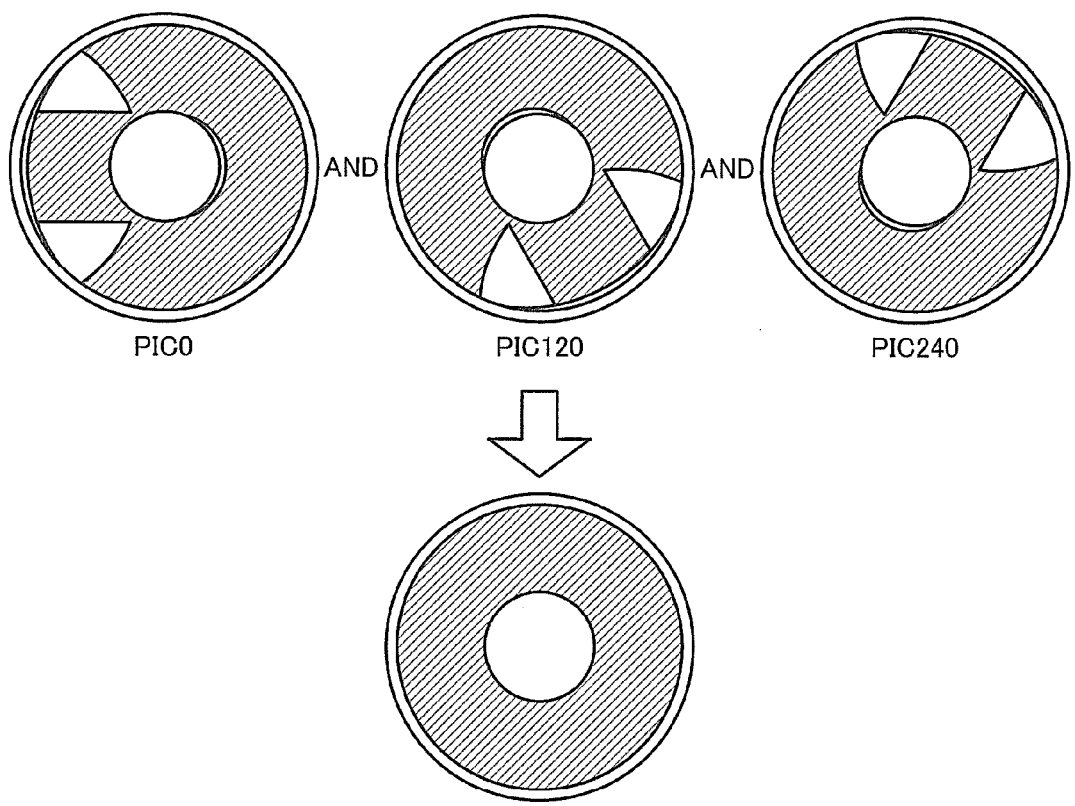
FIG. 7 is a diagram for explaining a method for combining three still images, in accordance with embodiments of the present invention.

FIG. 7 is a diagram for explaining a method for combining the still images, in accordance with embodiments of the present invention.

In this embodiment, image processing is performed to logically AND three still images PIC0, PIC120, and PIC240 to form the composite image PIC as illustrated. Specifically, the bright areas 272 and 274 (see FIG. 5(a)), that is, the areas that have brightness equal to or higher than a criterion, common to all of the three still images PIC0, PIC120 and PIE240 are extracted and inserted into the composite image PIC. As a result, areas that depend on the direction of irradiation with light are eliminated from the still images, so that only the sufficiently bright areas 272 and 274 of the seal face are on the composite image PIC, forming an image of a seal impression. The seal impression image is stored as an image against which a seal impression can be checked.

A configuration and operation of the information processing apparatus 10 of the seal impression image generation system described above will be described below.

Figure 8:
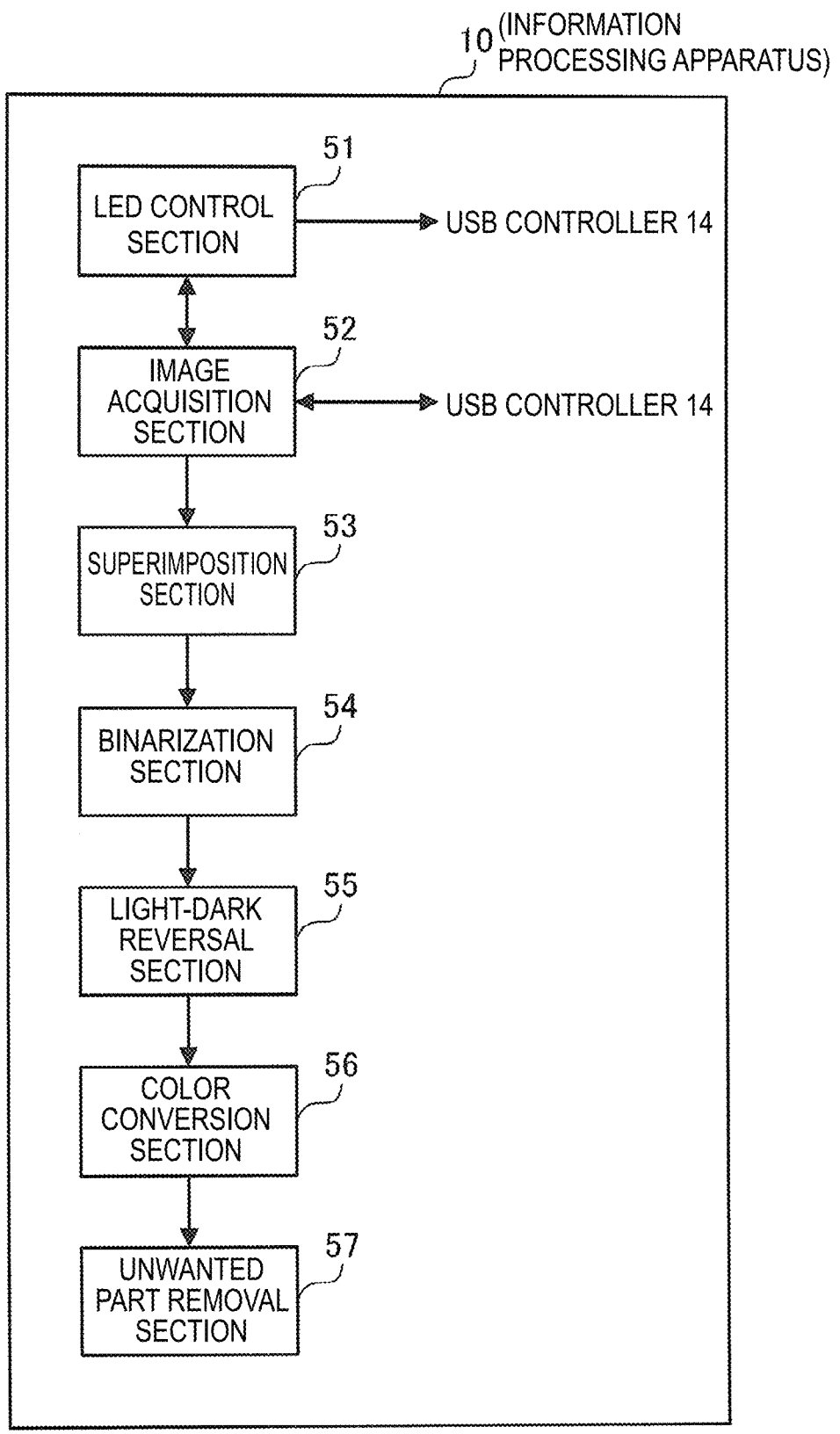
FIG. 8 is a block diagram illustrating an exemplary functional configuration of an information processing apparatus, in accordance with embodiments of the present invention.

FIG. 8 is a block diagram illustrating an exemplary functional configuration of the information processing apparatus 10, in accordance with embodiments of the present invention.

As illustrated, the information processing apparatus 10 includes an LED control section 51 and an image acquisition section 52. The information processing apparatus 10 also includes a superimposition section 53, a binarization section 54, a light-dark reversal section 55, a color conversion section 56, and an unwanted part removal section 57.

The LED control section 51 turns on and off switches on lines connected to LED0, LED120 and LED240 to control the LEDs so as to light up one after another. In this embodiment, the LED control section 51 is provided as one example of a control section that controls a light irradiation section so as to perform a process for sequentially irradiating a seal face with light from N directions, one direction after another. Thus, the LED control section 51 causes irradiation of a face 28 of a seal 27 with N beams of light, from N LEDs, striking the face in succession from N respective different directions respectively corresponding to N different angles of incidence of the light on the face, which is represented by steps 501, 503, and 505 (see FIG. 9) in an embodiment in which N=3. The face of the seal has a character engraved thereon. Generally, N at is least 2.

The image acquisition section 52 controls the USB camera 21 so as to take an image of the seal impression every time the LED0, LED120 or LED240 is lit to acquire still images PIC0, PIC120 and PIC240. It should be noted that a still image actually taken with the USB camera 21 is a mirror image of an image of a seal impression on paper. Therefore, it is assumed here that the still images PIC0, PIC120 and PIC240 are images obtained by mirroring, by a setting in the image acquisition section 52 or the USB camera 21, images actually taken with the USB camera 21. In this embodiment, the image acquisition section 52 is provided as an example of a control section that controls the image-taking section so as to perform a process of taking an image of a seal face irradiated with light from one direction for N directions and as an example of an acquisition section that acquires taken images. Thus, the image acquisition section 52 facilitates acquiring N still images of the face 28 corresponding respectively to the N beams of light striking the face in succession, which is represented by steps 502, 504, and 506 (see FIG. 9) in an embodiment in which N=3. Each still image is structured as a set of pixels such that each pixel comprises a red-green-blue (RGB) color combination.

The superimposition section 53 superimposes the still images PIC0, PIC120 and PIC 240 acquired by the image acquisition section 52 on one another to generate a composite image. Specifically, the superimposition section 53 performs a process of rendering bright parts common to the still images as bright parts in a composite image PIC and rendering dark parts in any of the still images PIC0, PIC120 and PIC 240 as dark parts in the composite image. The process may involve, for example, adding luminance values of each of R, G and B in the still images PIC0, PIC120 and PIC240 pixel by pixel and normalizing the resulting values, by multiplying the resulting values by a constant so that the largest value of each of R, G and B after the addition becomes equal to the largest value of each of R, G and B before the addition. R, G, and B denote red, green, and blue, respectively. In this embodiment, the superimposition section 53 is provided as an example of a generation section that extracts parts having brightness equal to or higher than a criterion to generate an image of a seal impression.

The binarization section 54 binarizes the composite image generated by the superimposition section 53. The binarization may be accomplished by rendering pixels having luminance levels (i.e., luminance values) higher than a threshold as bright pixels having a luminance value of "1" and pixels having luminance values equal to or lower than the threshold as dark pixels having a luminance value of "0", for example.

Thus, the superimposition section 53 and the binarization section 54 collectively combine the N still images to generate a composite image of pixels, which is represented by steps 507 and 508 (see FIG. 9) in an embodiment in which N=3. The combining of the N still images comprises generating in the composite image a common area of pixels that commonly appears on the face 28 of the seal 27 in all still images of the N still images. The common area has a luminance value exceeding a specified luminance threshold. The common area includes a character area 274 pertaining to where the engraved character is located on the face of the seal. The common area may also include an outer rim 272 of the face.

In one embodiment, the combining of the N still images comprises: (i) adding the R, G, and B luminance values of corresponding pixels in the N still images to form the pixels of the composite image; (ii) normalizing the pixels in the composite image such that the largest luminance value of each of R, G and B in the composite image becomes equal to the largest luminance value of each of R, G and B in the N still images; and (iii) rendering the pixels in the composite image having a luminance value exceeding and not exceeding the specified luminance threshold as having a luminance value of 1 and 0, respectively.

In one embodiment, the combining of the N still images comprises: (i) prior to the combining of the N still images, rendering the pixels in each still image having a luminance value exceeding and not exceeding the specified luminance threshold as having a luminance value of 1 and 0, respectively; and (ii) logically ANDing the corresponding pixels in the N still images to form the composite image.

Since the parts corresponding to the rim of the seal face and the character are light and the engraved parts of the seal face are dark in the composite image binarized by the binarization section 54, the light-dark reversal section 55 reverses light and dark in the composite image. For example, the light-dark reversal section 55 renders pixels with a luminance value of "1" to pixels with a luminance value of "0" and vice versa. Thus, the light-dark reversal section 55 implements: after the combining of the N still images, light and dark portions in the composite image are reversed by (i) replacing the luminance values of 1 with luminance values of 0 and (ii) replacing the luminance values of 0 with luminance values of 1, which is represented by step 509 (see FIG. 9).

Since the rim of the seal face and the character are represented in black in the composite image light-dark-reversed by the light-dark reversal section 55, the color conversion section 56 performs a color conversion process of converting black to red in one embodiment, which is the color of seal ink, so that the image appears suitable as a seal impression image. Thus in this embodiment, all pixels having a luminance value of 1 are converted to a color of sch as red, which is represented by step 510 (see FIG. 9).

Figure 9:
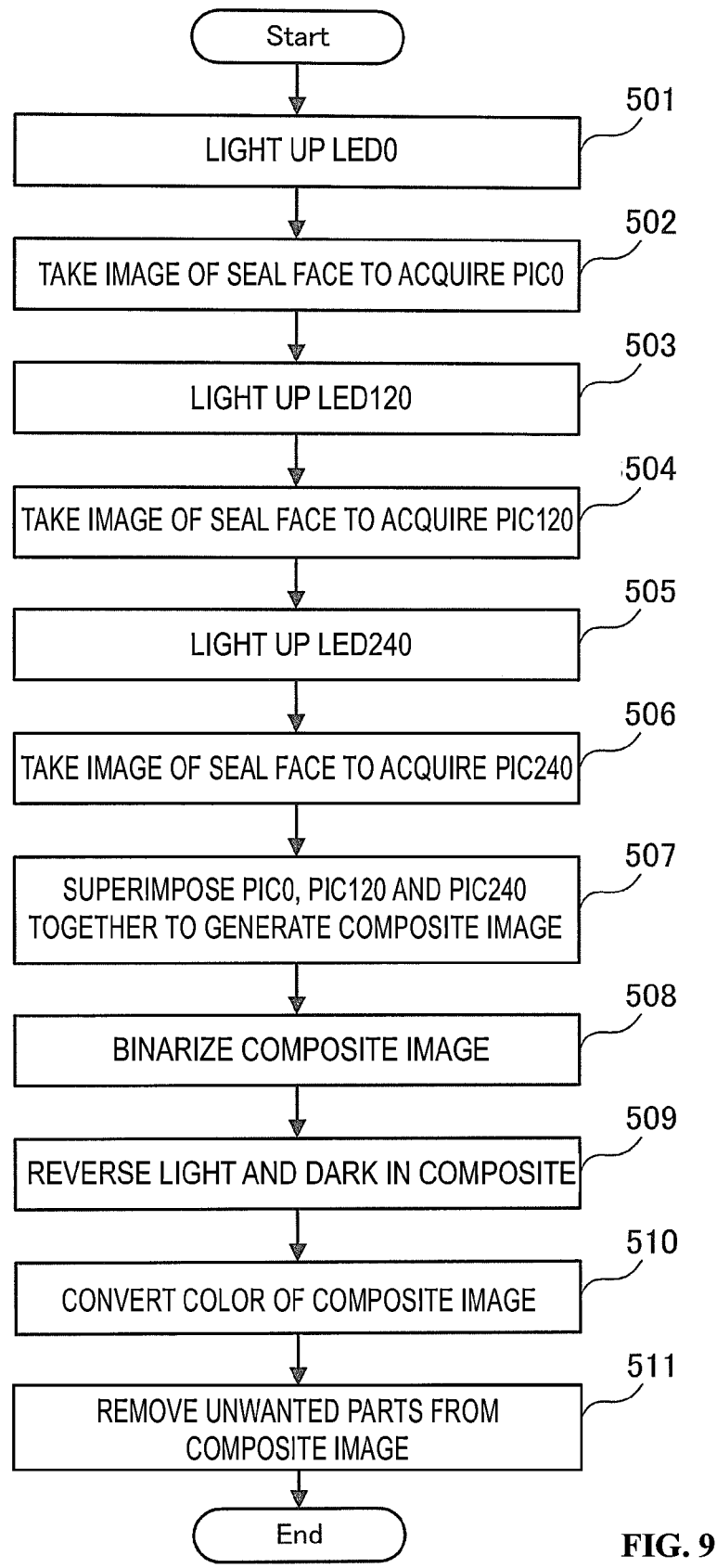
FIG. 9 is a flowchart illustrating an exemplary operation of the information processing apparatus, in accordance with embodiments of the present invention.

The unwanted part removal section 57 removes unwanted parts of the composite image color-converted by the color conversion section 56 to generate a seal impression image against which a seal impression can be checked, which is represented by step 511 (see FIG. 9).

FIG. 9 is a flowchart of an example operation of the information processing apparatus 10, in accordance with embodiments of the present invention.

As illustrated, first the LED control section 51 in the information processing apparatus 10 turns on LED0 (step 501). With LED0 being on, the image acquisition section 52 causes the USB camera 21 to take an image of the face 28 of a seal 27 to acquire a still image PIC0 (step 502). Note that after the still image PIC0 has been acquired, LED0 is turned off by the LED control section 51.

Then, the LED control section 51 turns on LED120 (step 503). With LED120 being on, the image acquisition section 52 causes the USB camera 21 to take an image of the seal face 28 to acquire a still image PIC120 (step 504). Note that after the still image PIC 120 has been acquired, LED120 is turned off by the LED control section 51.

Then, the LED control section 51 turns on LED240 (step 505). With LED240 being on, the image acquisition section 52 causes the USB camera 21 to take an image of the seal face 28 to acquire a still image PIC240 (step 506). Note that after the still image PIC240 has been acquired, LED240 is turned off by the LED control section 51.

Then the superimposition section 53 superimposes the still image PIC0 acquired at step 502, the still image PIC120 acquired at step 504, and the still image PIC240 acquired at step 506 together to generate a composite image (step 507).

Then the binarization section 54 binarizes the composite image (step 508).

The light-dark reversal section 55 then reverses light and dark in the binarized composite image (step 509).

Then the color conversion section 56 performs a conversion process of converting black in the light-dark reversed composite image to red, for example (step 510).

Finally, the unwanted part removal section 57 removes unwanted parts from the color-converted composite image (step 511).

While still images PIC0, PIC120 and PIC240 are superimposed to generate a composite image and then the composite image is binarized in this example of operation, the order of operations is not limited to this; light pixels and dark pixels in each of still images PIC0, PIC120 and PIC240 may be first rendered to "1" and "0", respectively, to generate a binarized image, then the binarized images may be ANDed (logical conjunction). The rendering of pixels is implemented in this embodiment by having luminance values higher than a threshold as bright pixels having a luminance value of "1" and pixels having luminance values equal to or lower than the threshold as dark pixels having a luminance value of "0".

In this way, an image of the seal face is taken while irradiating the seal face with light from each of the three directions, 0°, 120° and 240° at such an angle that shadows with a length equal to the radius of the seal face or longer are formed. Then bright areas common to the three still images taken are extracted from the images to generate an image of a seal impression, namely the composite image PIC in FIG. 7. Thus, a highly accurate image of the seal impression can be generated.

Furthermore, an image of the seal impression generated according to this embodiment can be affixed to a digital form to display the highly accurate image of the seal impression on a screen of the image processing apparatus 10. Once the owner of the seal has checked the digital form and then attached his/her digital signature to lock the form, the digital form can be used as an authenticated document.

Moreover, the seal impression image generation apparatus according to this embodiment allows one to digitize a seal impression with high accuracy and readily affix the digitized seal impression on a digital form at a window.

While the seal face is irradiated with light from three directions, 0°, 120° and 240°, in this embodiment, the number of directions is not limited to three. More generally, the face of a seal may be irradiated with N directions (where N is an integer greater than or equal to 2).

The angles formed by pairs of adjacent directions among the N directions (i.e., the angles formed by pairs of adjacent virtual directions among N virtual directions which are images projected on a virtual plane including the face of a seal in the N directions) may be the same or some of the angles may be different. If all the angles are the same, the angles will be (360°/N)°. For example, if N=3, the angles will be 120°, as described above. Some of the angles are different for example if the face of the seal is irradiated with three directions, 0°, 120° and 270°, when N=3.

While still images taken by the seal impression capturing apparatus 20 are sent to the information processing apparatus 10 through the USB cable 30 and image processing is applied to the still images in the information processing apparatus 10 to generate a seal impression image in this embodiment, the present invention is not limited to this. For example, the seal impression capturing apparatus 20 may apply image processing to still images taken by the seal impression capturing apparatus 20 to generate a seal impression image.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for generating an image of a seal impression, said method comprising:

causing, by a processor of an information processing apparatus, irradiation of a face of a seal with N beams of light striking the face in succession from N respective different directions respectively corresponding to N different angles of incidence of the light on the face, said face having a character engraved thereon, said N at least 2;

said processor acquiring N still images of the face corresponding respectively to the N beams of light striking the face in succession, each still image structured as a set of pixels such that each pixel comprises a red-green-blue (RGB) color combination; and said processor combining the N still images to generate a composite image of pixels, said combining comprising generating in the composite image a common area of pixels that commonly appears on the face of the seal in all still images of the N still images, said common area having a luminance value exceeding a specified luminance threshold, said common area including a character area pertaining to where the engraved character is located on the face of the seal.

2. The method of claim 1, wherein the face of the seal is circular and characterized by a radius, and wherein each beam forms on the face a shadow whose length is at least the radius of the face.

3. The method of claim 1, wherein said combining comprises:

adding the R, G, and B luminance values of corresponding pixels in the N still images to form the pixels of the composite image;

normalizing the pixels in the composite image such that the largest luminance value of each of R, G and B in the composite image becomes equal to the largest luminance value of each of R, G and B in the N still images; and rendering the pixels in the composite image having a luminance value exceeding and not exceeding the specified luminance threshold as having a luminance value of 1 and 0, respectively.

4. The method of claim 1, wherein said combining comprises:

prior to said combining, rendering the pixels in each still image having a luminance value exceeding and not exceeding the specified luminance threshold as having a luminance value of 1 and 0, respectively; and logically ANDing the corresponding pixels in the N still images to form the composite image.

5. The method of claim 1, said method further comprising;

after said combining, said processor reversing light and dark portions in the composite image by (i) replacing the luminance values of 1 with luminance values of 0 and (ii) replacing the luminance values of 0 with luminance values of 1; and said processor converting all pixels having a luminance value of 1 to a color of red.

6. The method of claim 1, wherein the common area further includes an outer rim of the face.

7. The method of claim 1, wherein N is at least 3.

8. An information processing apparatus, comprising a processor, a memory coupled to the processor, and a computer readable storage device coupled to the processor, said storage device containing program code configured to be executed by the processor via the memory to implement a method for generating an image of a seal impression, said method comprising:

said processor causing irradiation of a face of a seal with N beams of light striking the face in succession from N respective different directions respectively corresponding to N different angles of incidence of the light on the face, said face having a character engraved thereon, said N at least 2;

said processor acquiring N still images of the face corresponding respectively to the N beams of light striking the face in succession, each still image structured as a set of pixels such that each pixel comprises a red-green-blue (RGB) color combination; and said processor combining the N still images to generate a composite image of pixels, said combining comprising generating in the composite image a common area of pixels that commonly appears on the face of the seal in all still images of the N still images, said common area having a luminance value exceeding a specified luminance threshold, said common area including a character area pertaining to where the engraved character is located on the face of the seal.

9. The apparatus of claim 8, wherein the face of the seal is circular and characterized by a radius, and wherein each beam forms on the face a shadow whose length is at least the radius of the face.

10. The apparatus of claim 8, wherein said combining comprises:

adding the R, G, and B luminance values of corresponding pixels in the N still images to form the pixels of the composite image;

normalizing the pixels in the composite image such that the largest luminance value of each of R, G and B in the composite image becomes equal to the largest luminance value of each of R, G and B in the N still images; and rendering the pixels in the composite image having a luminance value exceeding and not exceeding the specified luminance threshold as having a luminance value of 1 and 0, respectively.

11. The apparatus of claim 8, wherein said combining comprises:

prior to said combining, rendering the pixels in each still image having a luminance value exceeding and not exceeding the specified luminance threshold as having a luminance value of 1 and 0, respectively; and logically ANDing the corresponding pixels in the N still images to form the composite image.

12. The apparatus of claim 8, said method further comprising;

after said combining, said processor reversing light and dark portions in the composite image by (i) replacing the luminance values of 1 with luminance values of 0 and (ii) replacing the luminance values of 0 with luminance values of 1; and said processor converting all pixels having a luminance value of 1 to a color of red.

13. The apparatus of claim 8, wherein the common area further includes an outer rim of the face.

14. The apparatus of claim 8, wherein N is at least 3.

15. A computer program product, comprising a computer readable storage device having a computer readable program code stored therein, said program code configured to be executed by a processor of an information processing apparatus to implement a method for generating an image of a seal impression, said method comprising:

causing, by the processor of the information processing apparatus, irradiation of a face of a seal with N beams of light striking the face in succession from N respective different directions respectively corresponding to N different angles of incidence of the light on the face, said face having a character engraved thereon, said N at least 2;

said processor acquiring N still images of the face corresponding respectively to the N beams of light striking the face in succession, each still image structured as a set of pixels such that each pixel comprises a red-green-blue (RGB) color combination; and said processor combining the N still images to generate a composite image of pixels, said combining comprising generating in the composite image a common area of pixels that commonly appears on the face of the seal in all still images of the N still images, said common area having a luminance value exceeding a specified luminance threshold, said common area including a character area pertaining to where the engraved character is located on the face of the seal.

16. The computer product of claim 15, wherein the face of the seal is circular and characterized by a radius, and wherein each beam forms on the face a shadow whose length is at least the radius of the face.

17. The computer product of claim 15, wherein said combining comprises:
adding the R, G, and B luminance values of corresponding pixels in the N still images to form the pixels of the composite image;
normalizing the pixels in the composite image such that the largest luminance value of each of R, G and B in the composite image becomes equal to the largest luminance value of each of R, G and B in the N still images; and
rendering the pixels in the composite image having a luminance value exceeding and not exceeding the specified luminance threshold as having a luminance value of 1 and 0, respectively.

18. The computer product of claim 15, wherein said combining comprises:
prior to said combining, rendering the pixels in each still image having a luminance value exceeding and not exceeding the specified luminance threshold as having a luminance value of 1 and 0, respectively; and
logically ANDing the corresponding pixels in the N still images to form the composite image.

19. The computer product of claim 15, said method further comprising;
after said combining, said processor reversing light and dark portions in the composite image by (i) replacing the luminance values of 1 with luminance values of 0 and (ii) replacing the luminance values of 0 with luminance values of 1; and
said processor converting all pixels having a luminance value of 1 to a color of red.

20. The computer product of claim 15, wherein the common area further includes an outer rim of the face.

* * * * *